United States Patent
Jiang et al.

(10) Patent No.: US 11,446,744 B2
(45) Date of Patent: Sep. 20, 2022

(54) POLYGONAL CUTTING BLADE HAVING CIRCULAR ARC-SHAPED GROOVE IN HOLE AND CUTTING TOOL

(71) Applicant: ZHUZHOU CEMENTED CARBIDE CUTTING TOOLS CO., LTD, Hunan (CN)

(72) Inventors: Aisheng Jiang, Hunan (CN); Shequan Wang, Hunan (CN); Aimin Tang, Hunan (CN); Junbo Xue, Hunan (CN); Xingdong Xiang, Hunan (CN)

(73) Assignee: ZHUZHOU CEMENTED CARBIDE CUTTING TOOLS CO., LTD, Hunan (CN)

( * ) Notice: Subject to any disclaimer, the term of this patent is extended or adjusted under 35 U.S.C. 154(b) by 112 days.

(21) Appl. No.: 16/650,857

(22) PCT Filed: Dec. 25, 2017

(86) PCT No.: PCT/CN2017/118302
§ 371 (c)(1),
(2) Date: Mar. 25, 2020

(87) PCT Pub. No.: WO2019/061896
PCT Pub. Date: Apr. 4, 2019

(65) Prior Publication Data
US 2020/0282467 A1    Sep. 10, 2020

(30) Foreign Application Priority Data

Sep. 30, 2017  (CN) ..................... 201710916679.2

(51) Int. Cl.
*B23B 27/16* (2006.01)

(52) U.S. Cl.
CPC ... *B23B 27/1611* (2013.01); *B23B 2200/0447* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,542,793 | A * | 8/1996 | Deiss | B23C 5/109 407/104 |
| 10,173,275 | B2 * | 1/2019 | Roman | B23C 5/2247 |
| 2013/0051938 | A1 * | 2/2013 | Satran | B23C 5/06 407/48 |

FOREIGN PATENT DOCUMENTS

| | | |
|---|---|---|
| CN | 102781613 | 11/2012 |
| CN | 103153506 | 6/2013 |

(Continued)

OTHER PUBLICATIONS

English translation of JP 2010253632 (Year: 2010).*

(Continued)

*Primary Examiner* — Alan Snyder
(74) *Attorney, Agent, or Firm* — JCIP Global Inc.

(57) ABSTRACT

A polygonal cutting blade having a circular arc-shaped groove in a hole includes a blade body composed of an upper surface, a lower surface and a plurality of main side surfaces connecting the upper surface and the lower surface. The blade body has a central hole penetrating through the upper surface and the lower surface, and is centrally symmetrical about a central axis of the central hole. At least one set of positioning side surface comprised of adjacent two of the main side surfaces is provided. An inner surface of the central hole has at least one circular arc-shaped groove fitting with a fastening screw for fixing the cutting blade. The circular arc-shaped groove directly faces toward an intersection of the two main side surfaces of the set of positioning side surface. A groove central axis of the circular arc-shaped groove has an offset distance from the central axis.

14 Claims, 6 Drawing Sheets

(56) References Cited

FOREIGN PATENT DOCUMENTS

| CN | 104708037 | | 6/2015 |
|---|---|---|---|
| JP | 2010253632 A | * | 11/2010 |
| WO | 9829210 | | 7/1998 |

OTHER PUBLICATIONS

"International Search Report (Form PCT/ISA/210) of PCT/CN2017/118302," dated May 25, 2018, with English translation thereof, pp. 1-4.

* cited by examiner

POLYGONAL CUTTING BLADE HAVING CIRCULAR ARC-SHAPED GROOVE IN HOLE AND CUTTING TOOL

CROSS-REFERENCE TO RELATED APPLICATION

This application is a 371 of international application of PCT application serial no. PCT/CN2017/118302, filed on Dec. 25, 2017, which claims the priority benefit of China application no. 201710916679.2, filed on Sep. 30, 2017. The entirety of each of the above mentioned patent applications is hereby incorporated by reference herein and made a part of this specification.

BACKGROUND

Technical Field

The present invention relates to a cutting process technology, in particular to a polygonal cutting blade having a circular arc-shaped groove in a hole and a cutting tool.

Description of Related Art

The clamping intensity and rigidity of the cutting blade have a significant influence on the cutting ability thereof in the course of cutting. Particularly, the clamping stability of the cutting blade has an essential influence on cutting efficiency and precision of the cutting blade. The cutting blade stably clamped is high in cutting efficiency, high in precision and long in service life. The cutting blade clamped unstably easily vibrates to cause rapid wear of the cutting blade in cutting, even chipping, which greatly shortens the service life of the cutting blade. To improve the cutting performance of the cutting blade in the industry, the cutting blade is designed as a plurality of cutting blade clamping structures, such as briquetting clamping, lever clamping, wedge clamping and hole clamping, thereby satisfying application of the cutting blade in different cutting conditions. The concentrically clamped cutting blade is applied extensively due to very excellent clamping intensity and rigidity and convenience to load/unload. Due to tolerance on manufacturing dimension of the cutting blade side surface and for the purpose of ensuring that the side surface of each cutting blade can be completely in contact with the side surface of the cutter groove of the cutting tool, a center of a fastener shall be generally moved inward the cutter groove for a certain distance relative to a center of a round hole of the cutting blade when the fastener clamps the cutting blade through the central hole, so that the central axis of the cutting blade is capable of moving toward the side surface from the central axis of the cutting blade when the cutting blade is clamped. This ensures that a bottom surface and the side surface of the cutting blade are in good contact with each other when it is applied in the cutter groove and the cutting performance of the cutting blade is stable.

Although the cutting blade clamped by the concentrically circumferential central hole has the above advantages in cutting, the center of the fastener is arranged away from the center of the round hole of the cutting blade, and the fastener can only contact the central hole of the cutting blade in a small-area (or point) manner. Even if enough clamping force can be provided to the cutting blade, the fastener is easily distorted to induce cutting vibration in many directions in cutting, and the cutting efficiency is low when the cutting blade is finished. Furthermore, the cutting blade is easily chipped at the time of cutting at high speed, and the cutting life is short.

SUMMARY

The aim of the present invention is to overcome the deficiencies of the prior art and to provide a polygonal cutting blade having a circular arc-shaped groove in a hole that is reliable and stable to position and long in service life and a cutting tool.

In order to solve the above technical problems, the present invention adopts the following technical solution.

A polygonal cutting blade having an arc-shaped groove in a hole includes a blade body composed of an upper surface, a lower surface and a plurality of main side surfaces connecting the upper surface and the lower surface. The blade body is provided with a central hole penetrating through the upper surface and the lower surface, and the blade body is centrally symmetrical about a central axis of the central hole. The main side surfaces intersect the upper surface to form a main cutting edge. In the plurality of main side surfaces, at least one set of positioning side surfaces comprised of adjacent two of the main side surfaces is provided. An inner surface of the central hole has at least one circular arc-shaped groove fitting with a surface of a fastening screw for fixing the cutting blade. A number of the circular arc-shaped groove corresponds to a number of the set of positioning side surfaces. Each circular arc-shaped groove directly faces toward an intersection of two main side surfaces of the set of positioning side surface, and a groove central axis of the circular arc-shaped groove has an offset distance from the central axis.

As further improvement of the above technical solution.

The offset distance is S, and 0.05 mm≤S≤0.2 mm.

In the plurality of main side surfaces, at least two sets of positioning side surface are provided. The number of the circular arc-shaped groove corresponds to the number of the sets of the positioning side surface, and two adjacent circular arc-shaped grooves intersect with each other.

In the positioning side surface, the adjacent two of the main side surfaces are smoothly connected through an angular side surface, and the circular arc-shaped grooves directly face toward the angular side surface.

The two adjacent circular arc-shaped grooves are connected smoothly through an angular groove.

The circular arc-shaped grooves include groove cylindrical surfaces, groove cambered surfaces and groove conical surfaces.

The circular arc-shaped grooves have groove symmetrical surfaces. Each groove symmetrical surface is an angular equally-dividing surface of an angle between the two main side surfaces in the corresponding positioning side surface. Each angular groove has an angular groove symmetrical surface, and the groove symmetrical surfaces and the angular groove symmetrical surfaces penetrate through the central axis.

In any plane that is parallel to the upper surface and intersects the groove cambered surface, a distance between each angular groove and the central axis on the corresponding angular groove symmetrical surface is h', and a distance between each circular arc-shaped groove adjacent to the corresponding angular groove and the central axis on the corresponding groove symmetrical surfaces is h, both of which meet: 0.1 mm≤h'−h≤0.5 mm.

Each angular groove comprises an angular groove cylindrical surface, an angular groove cambered surface and an angular groove conical surface, and the angular groove cylindrical surfaces, the angular groove cambered surfaces and the angular groove conical surfaces correspond to the groove cylindrical surfaces the groove cambered surfaces and the groove conical surfaces one by one, and the corresponding faces have the same height.

A radius of the groove cylindrical surface of each circular arc-shaped groove is R, and a radius of the angular groove cylindrical surface of each angular groove is R', both of which meet: $0.4 R \leq R' \leq 0.8 R$.

In the positioning side surface, the two main side surfaces are symmetrical about the corresponding groove symmetrical surface.

The blade body is a parallelogram plate shaped blade body. Two sets of positioning side surfaces are arranged, including one set of main side surfaces at both sides of an acute angle, and the other set of main side surfaces at both sides of another acute angle. Two circular arc-shaped grooves are arranged, directly facing toward two angular side surfaces respectively.

The blade body is a square plate-shaped blade body. Four sets of positioning side surfaces are arranged, and the main side surfaces at both sides of every right angle are a set of positioning side surfaces. Four circular arc-shaped grooves are arranged, directing facing toward four angular side surfaces respectively.

The blade body has a horizontal middle section and is symmetrical about the horizontal middle section, and the inner surfaces of a central hole above the horizontal middle section and the central hole below the horizontal middle section are both provided with circular arc-shaped grooves.

A cutting tool includes a cutter body and a fastening screw. The cutter body is provided with at least one cutter groove. The cutting tool further includes a polygonal cutting blade as said above. A number of the cutting blade corresponds to a number of the cutter groove, the cutter blades are arranged in the cutter grooves and are positioned by a set of positioning side surfaces, and the fastening screw concentrically contacts at least one circular arc-shaped groove in the central hole and presses the cutting blade into the cutter groove.

Compared with the prior art, the present invention has the following advantages.

(1) According to the polygonal cutting blade having the circular arc-shaped groove in the hole provided by the present invention, at least one circular arc-shaped groove capable of fitting with a surface of the fastening screw for fixing the cutting blade is provided in a central hole of the cutting blade. When in use, the blade body is fixed in the cutter groove of the blade body by the fastening screw, and then the fastening screw penetrates through the central hole, and the blade body is pressed into the cutter groove by screwing the fastening screw. After the fastening screw is screwed down, one circular arc-shaped groove concentrically contacts and fits the surface of the fastening screw. When the fastening screw is eccentrically pressed, the circular arc-shaped groove is normally and concentrically propped against the fastening screw on the central axis of the blade, and the fastening screw linearly contacts the inner surface of the central hole in a normal section of the central axis of the blade in a continuous arc-shaped contact manner, so that the fastening screw can enclose and clamp the cutting blade circumferentially at a large angle, a direction of the clamping force is essentially vertical to the contacted camber line and directs to a positioning surface, the circular arc-shaped groove in the central hole contacts the camber line of the fastening screw to form continuous multi-point repeated positioning clamp, thereby greatly improving the clamping rigidity, intensity and stability of the cutting blade. When only one circular arc-shaped groove is provided, the fastening screw forms a set of continuous multi-point repeated positioning clamping for the circular arc-shaped groove. Meanwhile, with increasing cutting force and increasing deformation of the fastening screw, when two circular arc-shaped grooves are provided, the circular arc-shaped grooves can form at most two sets of independent continuous multi-point repeated positioning clamping for the fastening screw by virtue of accurately designing an offset distance between the circular arc-shaped groove and the central axis. When four circular arc-shaped grooves are provided, the circular arc-shaped grooves can form at least one set of independent continuous multi-point repeated positioning clamping for the fastening screw. In other words, with changing cutting force, the central hole of the cutting blade can be adjusted automatically between a set of continuous multi-point repeated positioning clamping restraints and at most four sets of independent continuous multi-point repeated positioning clamping restraints, and the clamping forces of all circular arc-shaped grooves can be distributed reasonably, therefore, cutting vibration can be avoided in case of cutting with high efficiency and large cutting force, and cutting life and precision of the cutting blade can be still ensured. Due to a plurality of sets of continuous arc-shaped linear contact between the circular arc-shaped grooves and the fastening screw, the deformable direction and area coverage of the fastening screw in the central hole of the circular blade are greatly reduced, cutting vibration is restrained, and the cutting precision, processing efficiency and cutting life are improved.

(2) According to the polygonal cutting blade having the circular arc-shaped groove in the hole provided by the present invention, an angular groove is provided to: firstly, connect two adjacent circular arc-shaped grooves. Secondly, ensure that the fastening screw is capable of automatically adjusting the ability to form one or a plurality of sets of continuous arc-shaped repeated positioning clamping restraints in the central hole of the cutting blade with changing cutting force when a plurality of circular arc-shaped grooves are provided.

(3) The above polygonal cutting blade is applied to the cutting tool provided by the present invention. The fastening screw and the circular arc-shaped groove in the central hole of the cutting blade are concentrically designed, and the fastening screw is not required to deviate from the center of the round hole of the cutting blade when the cutting tool is made, so that simple production is realized and good contact between the polygonal cutting blade and the side surface of the cutter groove in batches can be ensured. The fastening screw forms circumferential omnibearing repeated positioning clamping of the circular arc-shaped groove for the positioning side surfaces and cutting area of the cutting blade, thereby effectively controlling unfavorable distortion directions and areas of the fastener, and effectively attenuating vibration of the cutting blade in cutting. Such cutting tools still have high-quality surface processing ability and excellent dimension precision in case of large overhang length, cutting depth and feeding, and thus can be applied to efficient rough cutting and precise cutting, with very extensive application range.

DESCRIPTION OF THE EMBODIMENTS

The present invention will be further clarified based on the following figures and embodiments.

Embodiment 1

As shown in FIG. 1 to FIG. 5, a polygonal cutting blade having an arc-shaped groove in a hole of this embodiment includes a blade body 1 composed of an upper surface 2, a lower surface 3 and a plurality of main side surfaces 41 connecting the upper surface 2 and the lower surface 3. The blade body 1 is provided with a central hole 5 penetrating through the upper surface 2 and the lower surface 3, and the blade body 1 is centrally symmetrical about a central axis 6 of the central hole 5. The main side surfaces 41 intersect the upper surface 2 to form a main cutting edge 7. In the plurality of main side surfaces 41, at least one set of positioning side surface comprised of two adjacent main side surfaces 41 is provided. An inner surface of the central hole 5 has at least one circular arc-shaped groove 51 fitting with the surface of a fastening screw 11 for fixing the cutting blade. A number of the circular arc-shaped groove 51 corresponds to a number of the set of the positioning side surface, each circular arc-shaped groove 51 directly faces toward an intersection of two main side surfaces 41 of a set of positioning side surface, and a groove central axis 515 of the circular arc-shaped groove 51 has an offset distance from the central axis 6.

Figure 1:
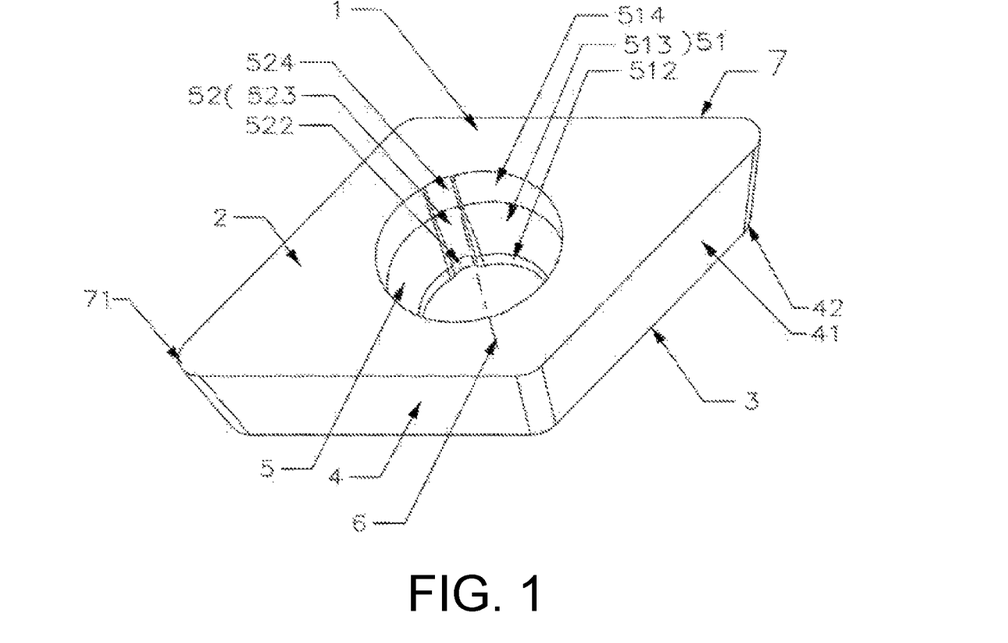
FIG. 1 illustrates a stereostructure of Embodiment 1 of the present invention.
Figure 2:
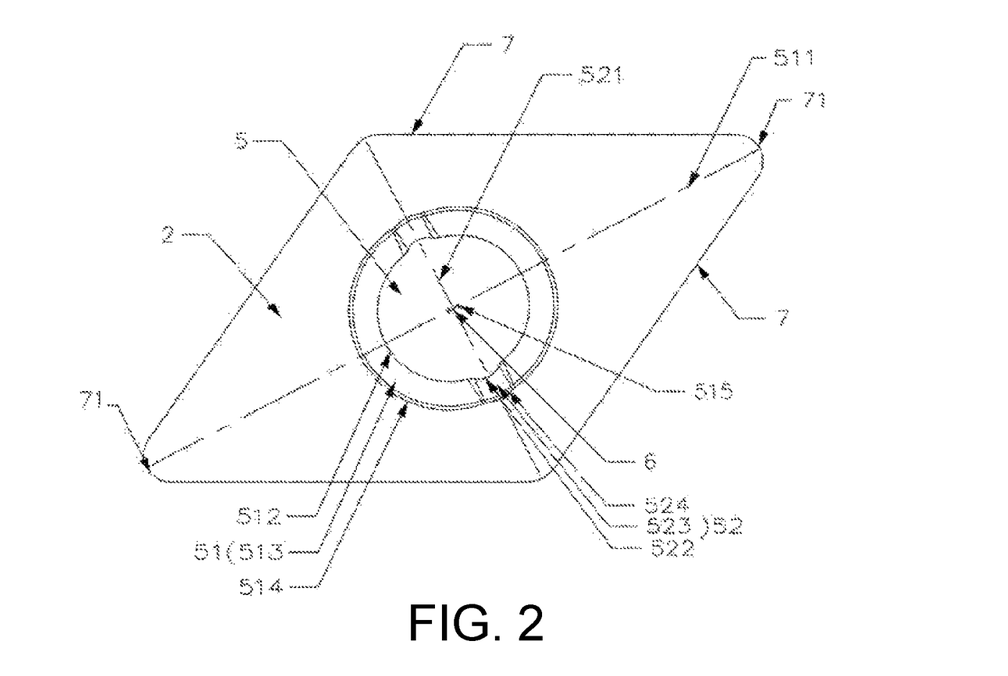
FIG. 2 illustrates a top view of Embodiment 1 of the present invention.
Figure 3:
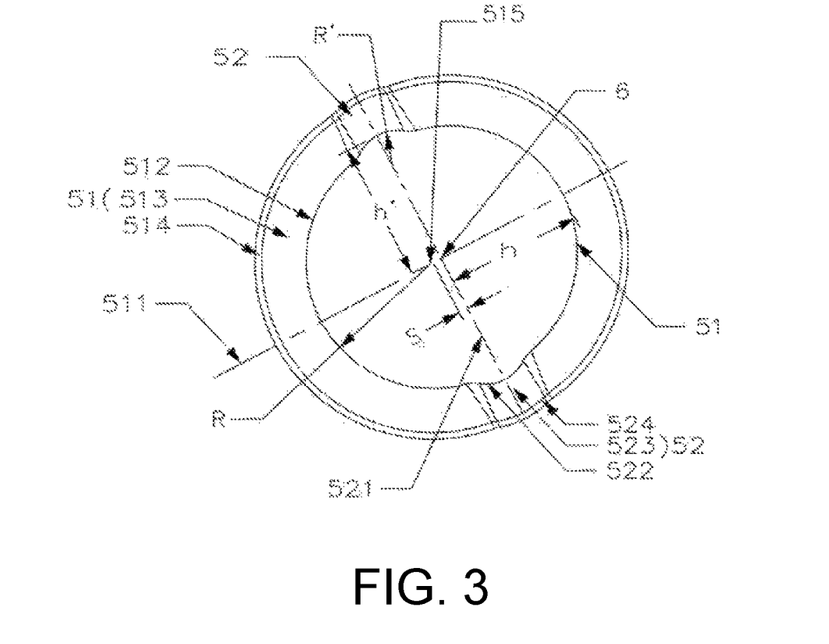
FIG. 3 illustrates a structure of a central hole of Embodiment 1 of the present invention.

In this embodiment, the blade body 1 is exemplified by a parallelogram plate shaped cutter body. Two sets of the positioning side surfaces are arranged on the blade body 1. The positioning side surfaces are comprised of the two adjacent main side surfaces 41, including one set of main side surfaces 41 at both sides of an acute angle, and the other set of main side surfaces 41 at both sides of another acute angle. Two circular arc-shaped grooves 51 are arranged on the diagonals of two acute angles. The two circular arc-shaped grooves 51 intersect with each other. The two circular arc-shaped grooves 51 are connected by a straight line or the protruding camber line to avoid the fastening screw 11.

In a specific application example, the offset distance S (the distortion of the fastener caused by the cutting force may be less than an S value if the S value is excessive, so that a plurality of sets of continuous camber line contact cannot be formed. If the S value is small, the fastener may contact the groove outside the inner side of the blade first, but not contact the groove corresponding to the positioning surface when a manufacturing error is large, so that unstable clamping will be formed and the service life of the blade will be reduced) between the groove central axis 515 and the central axis 6 ranges from 0.05 mm to 0.2 mm. In this embodiment, S is 0.12 mm, and the offset distance S is not zero.

Figure 4:
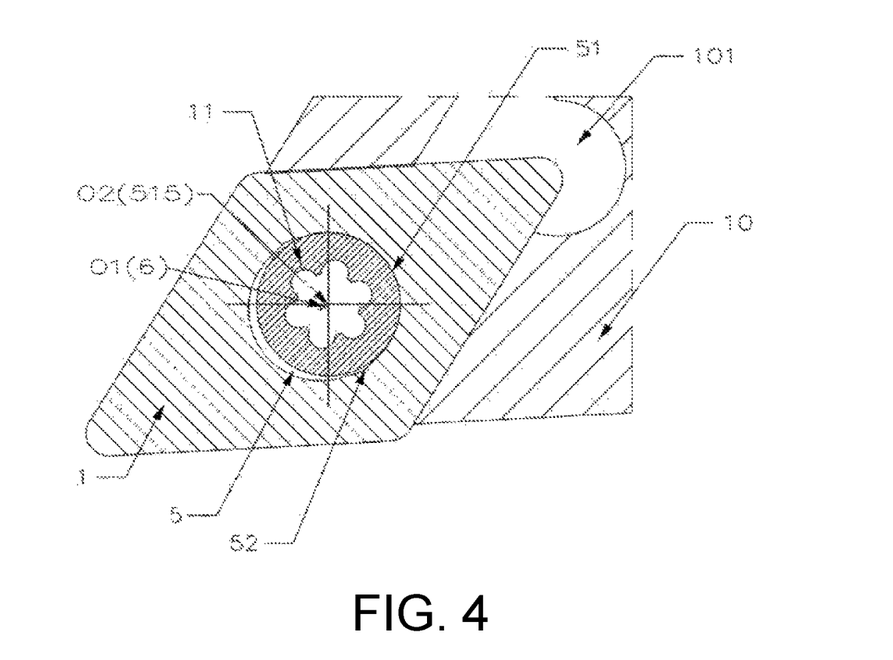
FIG. 4 illustrates a positioning and installation diagram of a cutting blade in Embodiment 1 of the present invention.

When the circular cutting blade in this embodiment is applied, the circular cutting blade is mounted in the cutter groove 101 of the cutter body 10 and is pressed by the fastening screw 11. In this embodiment, when in use, the blade body 1 is secured into the cutter groove 101 of the cutter body 10 by the fastening screw 11, and the fastening screw 11 penetrates through the central hole 5. As shown in FIG. 4, the main side surfaces 41 at two corresponding sides of the acute angle at top right corner are positioning side surfaces, and the blade body 1 is pressed into the cutter groove 101 by screwing down the fastening screw 11. After the fastening screw 11 is screwed down, a center of the fastening screw 11 is O2 (on the groove central axis 515), and a center of the central hole 5 is O1 (on the central axis 6), between which there is a certain distance. This distance is the offset distance S. A threaded hole (not shown in the figure) of the corresponding fastening screw 11 on the blade body 10 has an offset distance S from the central hole 5. At this time, one circular arc-shaped groove 51 concentrically contacts and fits with a surface of the fastening screw 11, and the circular arc-shaped groove 51 is propped against the fastening screw 11 if the fastening screw 11 is eccentrically pressed, thereby forming the linear contact of continuous arc-shaped contact in the normal section of the central axis 6 by the fastening screw 11 and the central hole 5. Therefore, the fastener 11 can enclose and clamp the cutting blade circumferentially at a large angle, a direction of the clamping force is essentially vertical to the contacted camber line and directs to the positioning surface, the circular arc-shaped groove 51 at the top right corner in the central hole 5 contacts the camber line of the fastening screw 11 to form continuous multi-point repeated positioning clamping, thereby greatly improving the clamping rigidity, intensity and stability of the cutting blade. Meanwhile, with increasing cutting force and distortion of the fastening screw 11, the circular arc-shaped groove 51 at the bottom left corner relative to the circular arc-shaped groove 51 at the top right corner will contact the fastening screw 11 by accurately designing the offset distance S between the circular arc-shaped groove 51 and the central axis 6, thereby finally forming two sets of independent continuous multi-point repeated positioning clamping. In other words, with changing cutting force, the central hole 5 of the cutting blade may be automatically adjusted between a set of continuous multi-point repeated positioning clamping restraints and at most two sets of independent continuous multi-point repeated positioning clamping restraints, and the clamping forces of all circular arc-shaped grooves 51 can be distributed reasonably, therefore, cutting vibration can be avoided in case of cutting with high efficiency and high cutting force, and cutting life and precision of the cutting blade can be still ensured. Due to linear contacts of one or two sets of arc-shaped contacts between the two circular arc-shaped grooves 51 and the fastening screw 11, the deformable direction and area coverage of the fastening screw 11 in the central holes 5 of the circular blade are greatly reduced, cutting vibration is restrained, and cutting precision, processing efficiency and cutting life are improved.

In this embodiment, in each positioning side surface, the two adjacent main side surfaces 41 are smoothly connected through the angular side surface 42, and the circular arc-shaped grooves 51 directly face toward the angular side surfaces 42. Each angular side surface 42 intersects the upper surface 2 to form an angular cutting edge 71.

In this embodiment, the two adjacent circular arc-shaped grooves 51 are smoothly connected through a corresponding angular groove 52. The two circular arc-shaped grooves 51 are correspondingly provided with two angular grooves 52, respectively. The two angular grooves 52 are located on the diagonal between two obtuse angles of the parallelogram plate shaped cutter body.

In this embodiment, each of the circular arc-shaped grooves 51 comprises a groove cylindrical surface 512, a groove cambered surface 513 and s groove conical surface 514. Each angular groove 52 comprises an angular groove cylindrical surface 522, an angular groove cambered surface 523 and an angular groove conical surface 524. The angular groove cylindrical surfaces 522, the angular groove cambered surfaces 523 and the angular groove conical surfaces 524 correspond to the groove cylindrical surfaces 512, the groove cambered surfaces 513 and the groove conical surfaces 514 one by one, all of the corresponding surfaces have the same height. The circular arc-shaped grooves 51 have the groove symmetrical surfaces 511. Each groove symmetrical surface 511 is an angular equally-dividing surface (equivalent to a surface where the corresponding diagonal between the two acute angles is) of an angle between the two main side surfaces 41 in the positioning side surface, each angular groove 52 has an angular groove symmetrical surface 521 (equivalent to a surface where the diagonal between the two obtuse angles is), and the groove symmetrical surfaces 511 and the angular groove symmetrical surfaces 521 penetrate through the central axis 6 and are vertical to each other.

In this embodiment, a radius of the groove cylindrical surface 512 of each circular arc-shaped groove 51 is R, and a radius of the angular groove cylindrical surface 522 of each angular groove 52 is R', both of which meet: $0.4\,R \leq R' \leq 0.8\,R$. In other words, in any plane that is parallel to the upper surface 2 and intersects the corresponding groove cambered surface 513, a distance between each angular groove 52 and the central axis 6 on the corresponding angular groove symmetrical surface 521 is h', and a distance between each circular arc-shaped groove 51 adjacent to the corresponding angular groove 52 and the central axis 6 on the corresponding groove symmetrical surface 511 is h, both of which meet: $0.1\,\text{mm} \leq h'-h \leq 0.5\,\text{mm}$. The angular groove 52 is provided to: firstly, connect two adjacent circular arc-shaped grooves 51. Secondly, ensure that the fastener 11 is capable of automatically adjusting the ability to form one or a plurality of sets of continuous arc-shaped repeated positioning clamping restraints in the central hole of the cutting blade with changing cutting force when a plurality of circular arc-shaped grooves are provided.

In this embodiment, the two main side surfaces 41 are symmetrical about the groove symmetrical surface 511 in the each positioning side surface.

Figure 5:
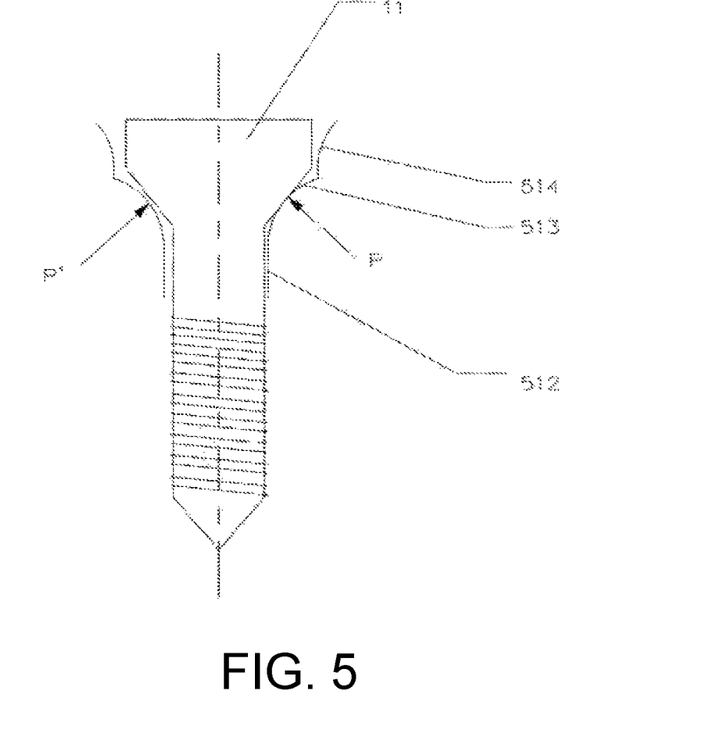
FIG. 5 illustrates combination between a circular arc-shaped groove and a fastening screw in Embodiment 1 of the present invention.

In this embodiment, after the fastening screw 11 is fastened in the central hole 5, a cooperative relationship between the groove cylindrical surfaces 512, the groove cambered surfaces 513 and the groove conical surfaces 514 is shown in FIG. 5. That is to say, in a horizontal plane that is parallel to the upper surface 2 and intersects the groove cambered surfaces 513 through the fastening screw 11, a conical surface of the fastening screw 11 and the groove cambered surfaces 513 are overlapped (the conical surface of the fastening screw 11 and the groove cambered surface 513 are overlapped as a circular arc line). In a vertical section (equivalent to a section overlapped with the groove symmetrical surfaces 511) vertical to the horizontal plane, the conical surface of the fastening screw 11 intersects the groove cambered surfaces 513 at a point P (an overlapped circular arc line consisting of a plurality of points P). With increasing cutting force, the fastening screw 11 may deflect to the other two circular arc-shaped grooves 51. Moreover, with gradually increasing deformation, the last two circular arc-shaped grooves 51 may concentrically contact the fastening screw 11 at the point P' (the overlapped circular arc line consisting of a plurality of points P'), so as to further produce the clamping force. Therefore, the fastening screw 11 concentrically contacts and props against the three circular arc-shaped grooves 51 simultaneously in final clamping. The point P where the conical surface of the fastening screw 11 intersects the groove cambered surfaces 513 is located at a certain point of the conical surface of the fastening screw 11.

In addition to this embodiment, the circular cutting blade may be a double blade cutting blade.

Embodiment 2

Figure 6:
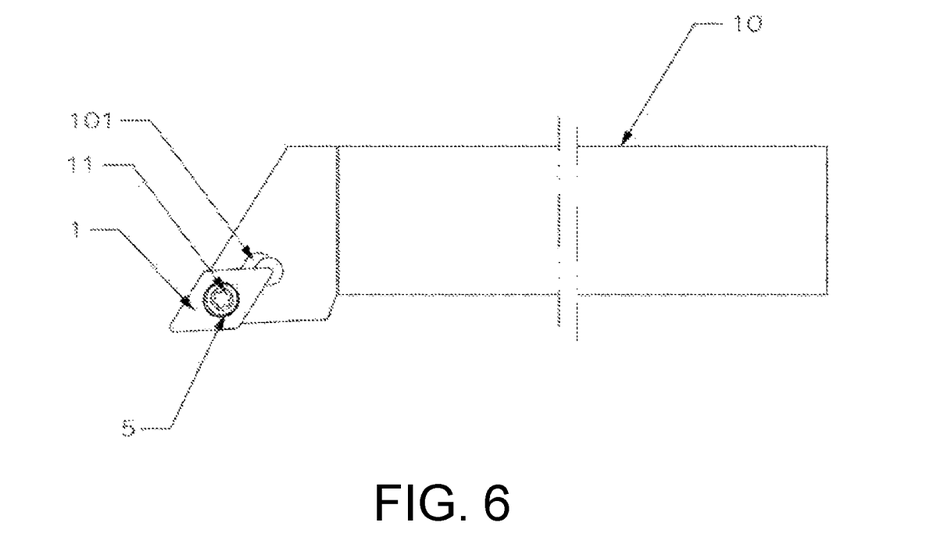
FIG. 6 illustrates a structure of Embodiment 2 of the present invention.

As shown in FIG. 6, the cutting tool of this embodiment comprises a cutter body 10 and a fastening screw 11. The cutting tool further comprises a polygonal cutting blade of Embodiment 1, the cutter body 10 is a square cutter bar, only one cutter groove 101 is defined in the cutter body 10, and the polygonal cutting blade fits with a positioning surface of a cutter groove 101 through a set of positioning side surfaces. The fastening screw 11 concentrically contacts at least one circular arc-shaped groove 51 in the central hole 5 and the cutting blade is pressed into the cutter groove 101.

In this embodiment, a positioning and installation process of the polygonal cutting blade is shown in Embodiment 1. In this embodiment, the circular arc-shaped grooves 51 and the fastening screw 11 form two sets of continuous arc-shaped repeated positioning clamping in final positioning.

In this embodiment, when the fastening screw 11 is screwed down, the fastening screw 11 concentrically contacts the circular arc-shaped groove 51 at the top right corner, and then concentrically contacts the circular arc-shaped groove 51 at the bottom left corner. If the fastening screw 11 is unscrewed, the circular arc-shaped groove 51 at the bottom left corner departs from the fastening screw 11, and then the circular arc-shaped groove 51 at the top right corner departs from the fastening screw 11.

In this embodiment, each of the two circular arc-shaped grooves 51 may be installed and positioned once, and the blade body 1 can be applied twice and can be installed reversely at two acute angles. That is to say, the blade body 1 can be used again at rotated 180°. Two positioning and pressing ways are the same.

According to the cutting tool provided by the present invention, the fastening screw 11 and the circular arc-shaped grooves 51 in the central hole 5 of the cutting blade are concentrically designed, and the fastening screw 11 is not required to deviate from a center of a round hole of the cutting blade when the cutting tool is made, so that simple production is realized and good contact between the polygonal cutting blade and the side surface of the cutter groove 101 in batches is ensured. The fastening screw 11 forms circumferential omnibearing repeated positioning clamping of the circular arc-shaped grooves 51 for the positioning side surfaces and cutting area of the cutting blade, thereby effectively controlling unfavorable distortion directions and areas of the fastener, and effectively attenuating vibration of the cutting blade in cutting. Such cutting tools still have high-quality surface processing ability and excellent dimension precision in case of large overhang length, cutting depth and feeding, and thus can be applied to efficient rough cutting and precise cutting, with very extensive application range.

Embodiment 3

As shown in FIG. 7 to FIG. 10, the polygonal cutting blade of this embodiment is approximately identical to Embodiment 1, and the differences therebetween lie in that as follows.

Figure 7:
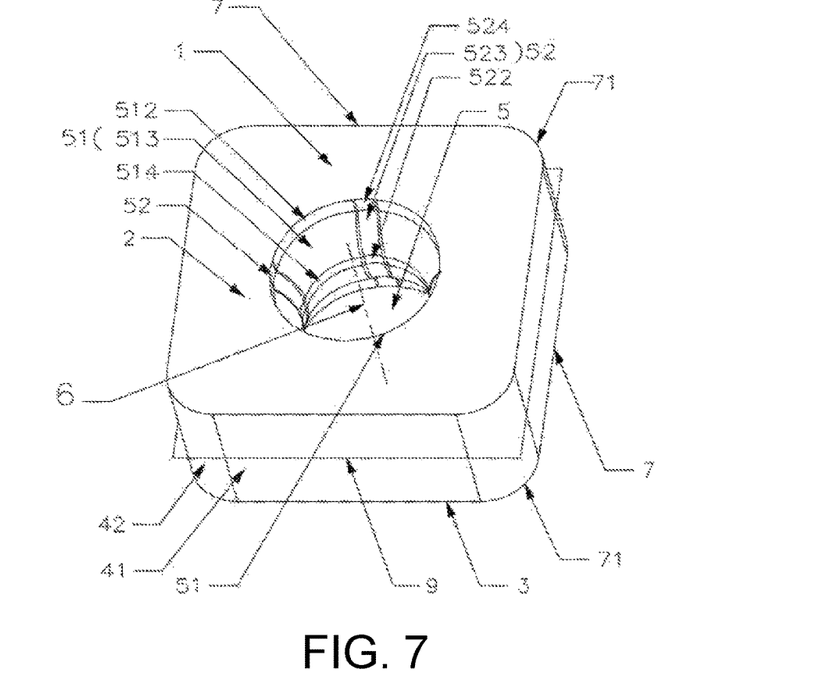
FIG. 7 illustrates a stereostructure of Embodiment 3 of the present invention.
Figure 8:
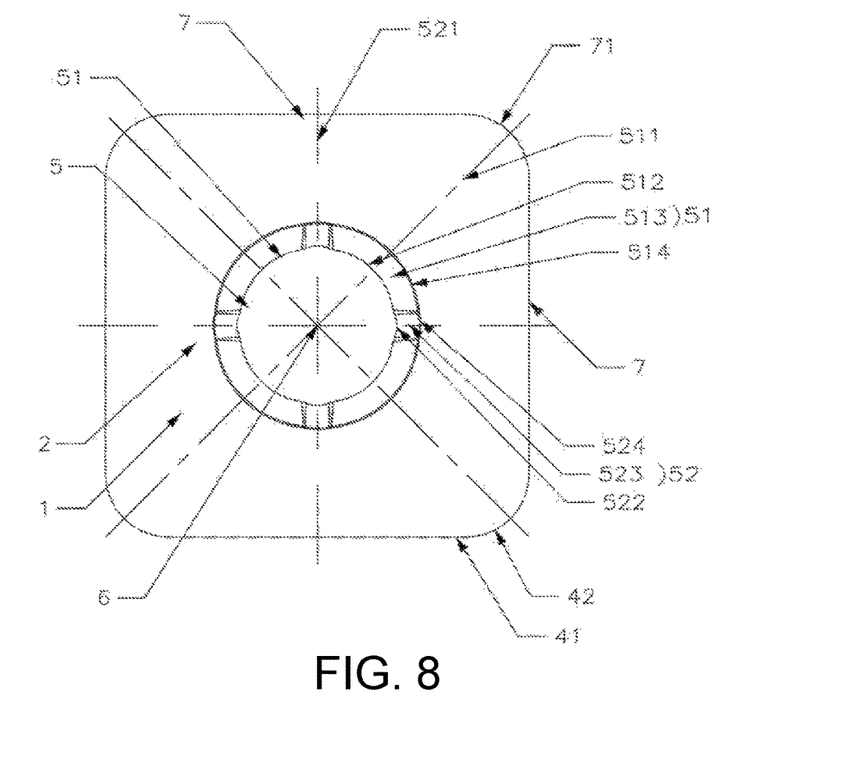
FIG. 8 illustrates a top view of Embodiment 3 of the present invention.
Figure 9:
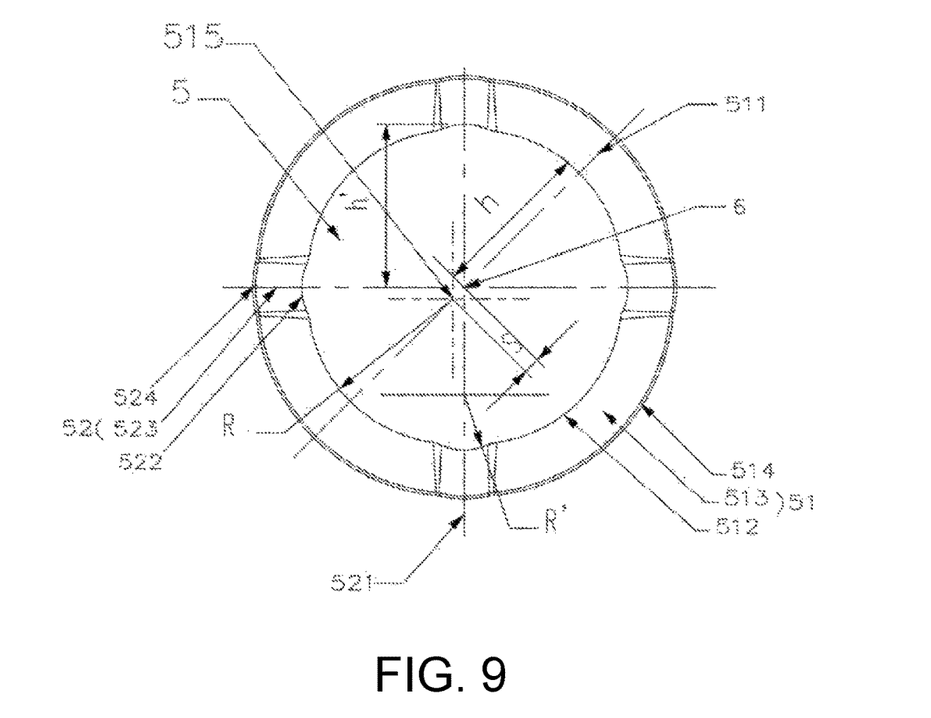
FIG. 9 illustrates a structure of a central hole in Embodiment 3 of the present invention.

In this embodiment, the blade body 1 is of a square plate shape, four sets of positioning side surfaces are arranged, and the main side surfaces 41 at both sides of every right angle are a set of positioning side surfaces. Four circular arc-shaped grooves 51 are arranged to directly face toward four angular side surfaces 42 respectively. Four angular grooves 52 directly face toward the four main side surfaces 41 respectively.

In this embodiment, a center distance between the circular arc-shaped grooves 51 on the same straight line is 2S.

Figure 10:
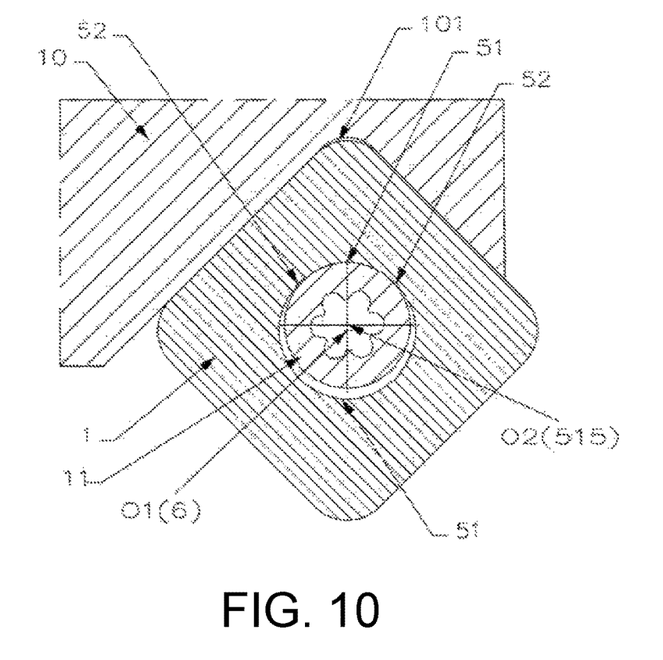
FIG. 10 illustrates a positioning and installation diagram of a cutting blade in Embodiment 3 of the present invention.

In this embodiment, the positioning and installation process of the polygonal cutting blade is essentially shown in Embodiment 1. However, four circular arc-shaped grooves 51 are arranged in this embodiment, including a first circular arc-shaped groove 51, a second circular arc-shaped groove 51, a third circular arc-shaped groove 51 and a fourth circular arc-shaped groove 51 in sequence. The first and third circular arc-shaped grooves 51 are located on the same straight line through the central axis 6, and the second and fourth circular arc-shaped grooves 51 are located in the same straight line through the central axis 6. Thus, the fastening screw 11 concentrically contacts the first circular arc-shaped groove 51 first to form a set of continuous arc-shaped repeated positioning clamping. With increasing cutting force and distortion of the fastening screw 11, the fastening screw 11 concentrically contacts the third circular arc-shaped groove 51 (due to the fact that the fastening screw 11 is distorted in a direction relative to the first circular arc-shaped groove 51), so as to form two sets of continuous arc-shaped repeated positioning clamping. Then, with increasing distortion of the fastening screw 11, the fastening screw 11 concentrically contacts the second circular arc-shaped groove 51 and the fourth circular arc-shaped groove 51 at both sides in sequence, so as to form four sets of continuous arc-shaped repeated positioning clamping finally.

In this embodiment, the blade body 1 has a horizontal middle section 9 and is symmetrical about the horizontal middle section 9, and the inner surfaces of a central hole 5 above the horizontal middle section 9 and the central hole 5 below the horizontal middle section 9 are both provided with circular arc-shaped grooves 51. A cutting edge 7 is formed between the lower surface 3 and the side surface 4, namely, the cutting blade of this embodiment is a double blade with the completely same structures at both surfaces. Each surface can be applied four times after rotated 90° once, so as to ensure that at least one circular arc-shaped groove 51 concentrically contacts and fits with the fastening screw 11. Double surfaces can be applied eight times.

In addition to this embodiment, the polygonal cutting blade may be a single cutting blade as well.

Embodiment 4

Figure 11:
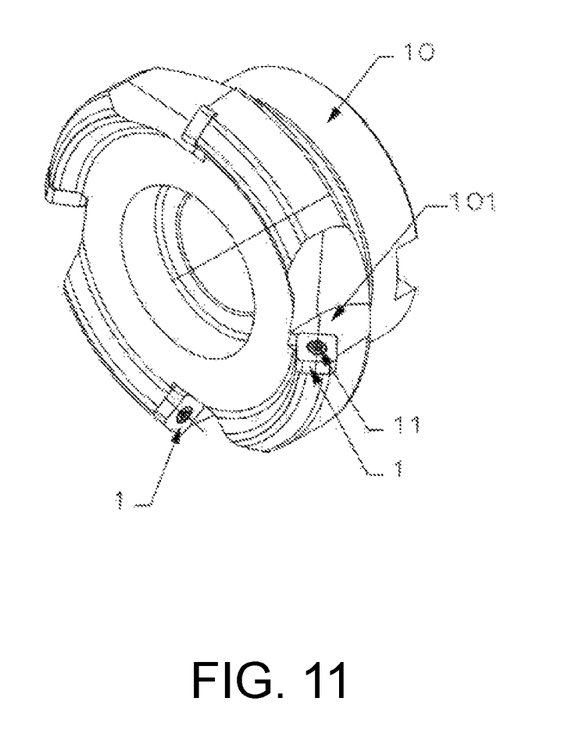
FIG. 11 illustrates a structure of Embodiment 4 of the present invention.

As shown in FIG. 11, this embodiment is approximately the same as Embodiment 2, and the differences therebetween lie in that as follows.

According to the cutting tool of this embodiment, the cutter body 10 is a disc cutter bar with an axis, the cutter body 10 is provided with four cutter grooves 101. The cutting tool further comprises a polygonal cutting blade of Embodiment 3, the number of cutting blades corresponds to the number of cutter grooves 101, the cutter blades are arranged in the cutter grooves 101 and are positioned by a set of positioning side surfaces, and the fastening screw 11 concentrically contacts at least one circular arc-shaped groove 51 in the central hole 5 and presses the cutting blade into the cutter groove 101.

In this embodiment, a positioning and installation process of the polygonal cutting blade is shown in Embodiment 3. With increasing cutting force and distortion of the fastening screw 11, the fastening screw 11 concentrically contacts the circular arc-shaped grooves 51. The circular arc-shaped grooves 51 and the fastening screw 11 form four sets of continuous multi-point repeated positioning clamping in final positioning.

Embodiment 5

The cutting tool of this embodiment is approximately identical to Embodiment 1, and the differences therebetween lie in that as follows.

In this embodiment, one circular arc-shaped groove 51 is provided on an inner surface of the central hole 5, and one circular arc-shaped groove 51 and the fastening screw 11 form repeated positioning clamping. The polygonal cutting blade of this embodiment can be positioned and installed once.

In addition to this embodiment, the polygonal cutting blade may be a double cutting blade as well.

In the above embodiment 1, embodiment 3 and embodiment 5, the circular blade body 1 is constituted by the quadrilateral cutting blade through single and double groove structures. There are 1-4 circular arc-shaped grooves 51 respectively. When the blade body 1 is put into use, the circular arc-shaped grooves 51 in the central 5 are clamped and restrained, changing from one to four sets of continuous arc-shaped repeated positioning clamping. The present invention is not limited to this. According to different cutting conditions and circular blade shapes, the central hole 5 in the blade body 1 is provided with more circular arc-shaped grooves 51 and the angular grooves 52, so that the central hole 5 can be changed between at least one set, no less than four sets of continuous arc-shaped repeated positioning clamping.

In the above embodiment 2 and embodiment 4, the quadrangular cutting blade is mainly applied to turning or milling, but the present invention is not limited to this. According to different processing methods, the cutting blade of the cutting tool can be designed as other shapes applied to boring and drilling tools, etc.

While the preferred embodiments of the present invention have been disclosed as above, they are not intended to limit the present invention. Any person skilled in the art, without departing from the scope of the technical solution of the present invention, can take advantage of the above-described technical content to make many possible variations and modifications of the present invention, or equivalent embodiments with equivalent change. Therefore, all the contents without departing from the technical solution of the present invention, based on any simple modification, equivalent variations and modifications of the present invention made by the technical essence of the present invention for the above embodiment, would fall within the protection scope of the technical solution of the present invention.

What is claimed is:

1. A polygonal cutting blade having a circular arc-shaped groove in a hole, the polygonal cutting blade comprising a blade body composed of an upper surface, a lower surface and a plurality of main side surfaces connecting the upper surface and the lower surface; wherein the blade body is provided with a central hole penetrating through the upper surface and the lower surface, and the blade body is centrally symmetrical about a central axis of the central hole; the main side surfaces intersect the upper surface to form a main cutting edge; in the plurality of main side surfaces, at least one set of positioning side surfaces comprised of adjacent two of the main side surfaces is provided; an inner surface of the central hole has at least one circular arc-shaped groove fitting with a surface of a fastening screw for fixing the cutting blade; the circular arc-shaped groove corresponds in number with the set of positioning side surfaces; each circular arc-shaped groove directly faces toward an intersection of the two main side surfaces of the set of positioning side surfaces, the circular arc-shaped groove surrounds a groove central axis as a center, and the groove central axis has an offset distance from the central axis, and the groove central axis is not coaxial with the central axis, wherein the offset distance between the groove central axis and the central axis is S, and $0.05 \text{ mm} \leq S \leq 0.2 \text{ mm}$ is satisfied, and a continuous arc-shaped linear contact is formed between the arc-shaped groove and the fastening screw.

2. The polygonal cutting blade having the circular arc-shaped groove as recited in claim 1, wherein in the plurality of main side surfaces, at least two sets of the positioning side surfaces are provided; the number of the circular arc-shaped groove corresponds to the number of the sets of the positioning side surfaces, and two adjacent circular arc-shaped grooves intersect with each other.

3. The polygonal cutting blade having the circular arc-shaped groove as recited in claim 2, wherein in each set of the positioning side surfaces, the adjacent two of the main side surfaces are smoothly connected through an angular side surface, and each of the circular arc-shaped grooves directly face toward the angular side surface.

4. The polygonal cutting blade having the circular arc-shaped groove as recited in claim 3, wherein the blade body is a parallelogram plate shaped blade body; the positioning side surfaces are arranged in two sets, one set of the positioning side surfaces is the main side surfaces at both sides of an acute angle, and another set of the positioning side surfaces is the main side surfaces at both sides of another acute angle; two circular arc-shaped grooves are arranged and directly face toward two angular side surfaces respectively.

5. The polygonal cutting blade having the circular arc-shaped groove as recited in claim 3, wherein the blade body is a square plate-shaped blade body; the positioning side surfaces are arranged in four sets, and the main side surfaces at both sides of every right angle are one set of the positioning side surfaces; four circular arc-shaped grooves are arranged, and directly face toward four angular side surfaces respectively.

6. The polygonal cutting blade having the circular arc-shaped groove as recited in claim 2, wherein the two adjacent circular arc-shaped grooves are connected smoothly through an angular groove.

7. The polygonal cutting blade having the circular arc-shaped groove as recited in claim 6, wherein each of the circular arc-shaped grooves comprise a groove cylindrical surface, a groove cambered surface and a groove conical surface.

8. The polygonal cutting blade having the circular arc-shaped groove as recited in claim 7, wherein each of the circular arc-shaped grooves have a groove symmetrical surface; the groove symmetrical surface is an angular equally-dividing surface of an angle between the two main side surfaces in each set of the positioning side surfaces; the angular groove has an angular groove symmetrical surface, and the groove symmetrical surface and the angular groove symmetrical surface penetrate through the central axis.

9. The polygonal cutting blade having the circular arc-shaped groove as recited in claim 8, wherein in any plane that is parallel to the upper surface and intersects the groove cambered surface, a distance between the angular groove and the central axis on the angular groove symmetrical surface is h', and a distance between each of the circular arc-shaped grooves adjacent to the angular groove and the central axis on the groove symmetrical surface is h, and $0.1 \text{ mm} \leq h'-h \leq 0.5 \text{ mm}$ is satisfied.

10. The polygonal cutting blade having the circular arc-shaped groove as recited in claim 9, wherein the angular groove comprises an angular groove cylindrical surface, an angular groove cambered surface and an angular groove conical surface, and the angular groove cylindrical surface corresponds to and has same height with the groove cylindrical surface, the angular groove cambered surface corresponds to and has same height with the groove cambered surface, and the angular groove conical surface corresponds to and has same height with the groove conical surface.

11. The polygonal cutting blade having the circular arc-shaped groove as recited in claim 10, wherein a radius of the groove cylindrical surface of each of the circular arc-shaped grooves is R, and a radius of the angular groove cylindrical surface of the angular groove is R', and $0.4 R \leq R' \leq 0.8 R$ is satisfied.

12. The polygonal cutting blade having the circular arc-shaped groove as recited in claim 8, wherein in each set of the positioning side surfaces, the two main side surfaces are symmetrical about the groove symmetrical surface.

13. The polygonal cutting blade having the circular arc-shaped groove as recited in claim 1, wherein the blade body has a horizontal middle section and is symmetrical about the horizontal middle section, and the inner surfaces of the central hole above the horizontal middle section and of the central hole below the horizontal middle section are both provided with the circular arc-shaped grooves.

14. A cutting tool, comprising a cutter body and a fastening screw, wherein the cutter body is provided with at least one cutter groove, and the cutting tool further comprises the polygonal cutting blade as recited in claim 1, the cutting blade corresponds in number with the cutter groove, the cutter blade is arranged in the cutter groove and is positioned by the set of the positioning side surfaces, and the fastening screw concentrically contacts the at least one circular arc-shaped groove in the central hole and presses the cutting blade into the cutter groove.

\* \* \* \* \*